United States Patent [19]

Adcock

[11] Patent Number: 4,513,614
[45] Date of Patent: Apr. 30, 1985

[54] METHOD AND DEVICE FOR FILTERING LUBRICATING OIL FOR A DOUGH DIVIDER MACHINE

[76] Inventor: DL Adcock, 6412 S. Douglas Ave., Oklahoma City, Okla. 73139

[21] Appl. No.: 498,064

[22] Filed: May 25, 1983

[51] Int. Cl.³ .................. G01N 5/00; G01N 33/10; B01D 37/00
[52] U.S. Cl. .................. 73/169; 210/805; 210/85; 210/168; 364/567; 426/231; 426/233; 426/503
[58] Field of Search .................. 210/805, 85, 806, 739, 210/167, 168, 311, DIG. 8; 426/503, 231, 232, 233; 73/169, 53, 61 R; 304/567, 568

[56] References Cited

U.S. PATENT DOCUMENTS

| | | | |
|---|---|---|---|
| 1,065,992 | 1/1913 | Wheelock | 210/311 |
| 2,312,091 | 2/1943 | Gray | 210/107 |
| 2,425,848 | 8/1947 | Vawter | 210/DIG. 8 |
| 2,733,815 | 2/1956 | Kwochka | 210/DIG. 8 |
| 3,045,827 | 7/1962 | Hough | 210/DIG. 8 |
| 3,263,818 | 8/1966 | Gedrich | 210/DIG. 8 |
| 3,368,682 | 2/1968 | Boots | 210/167 |
| 3,931,011 | 1/1976 | Richards | 210/311 |
| 3,968,741 | 7/1976 | Hunt | 210/DIG. 8 |
| 4,017,397 | 4/1977 | Copeland | 210/311 |
| 4,282,094 | 8/1981 | Mitchell | 210/DIG. 8 |

Primary Examiner—Ernest G. Therkorn
Attorney, Agent, or Firm—Chris H. Morgan

[57] ABSTRACT

A method and device for use in connection with a dough divider machine which continuously uses mineral oil for lubrication. The method comprises capturing mineral oil, flour, and dough contaminants which becomes mixed as the dough divider operates and filtering the captured mixture so that substantially pure mineral oil is separated from the flour, dough and contaminates. The substantially pure mineral oil is then injected back into the dough divider machine for lubrication. By comparing lost mineral oil to the weight of bakery products produced during a predetermined period, the amount of mineral oil in the bakery products is determined. The filtration method and device utilize a gravity filtration diffuser coalesence and precipitation and a suction filtration. The device is portable for use with either one or more dough divider machines and for cleaning.

3 Claims, 5 Drawing Figures

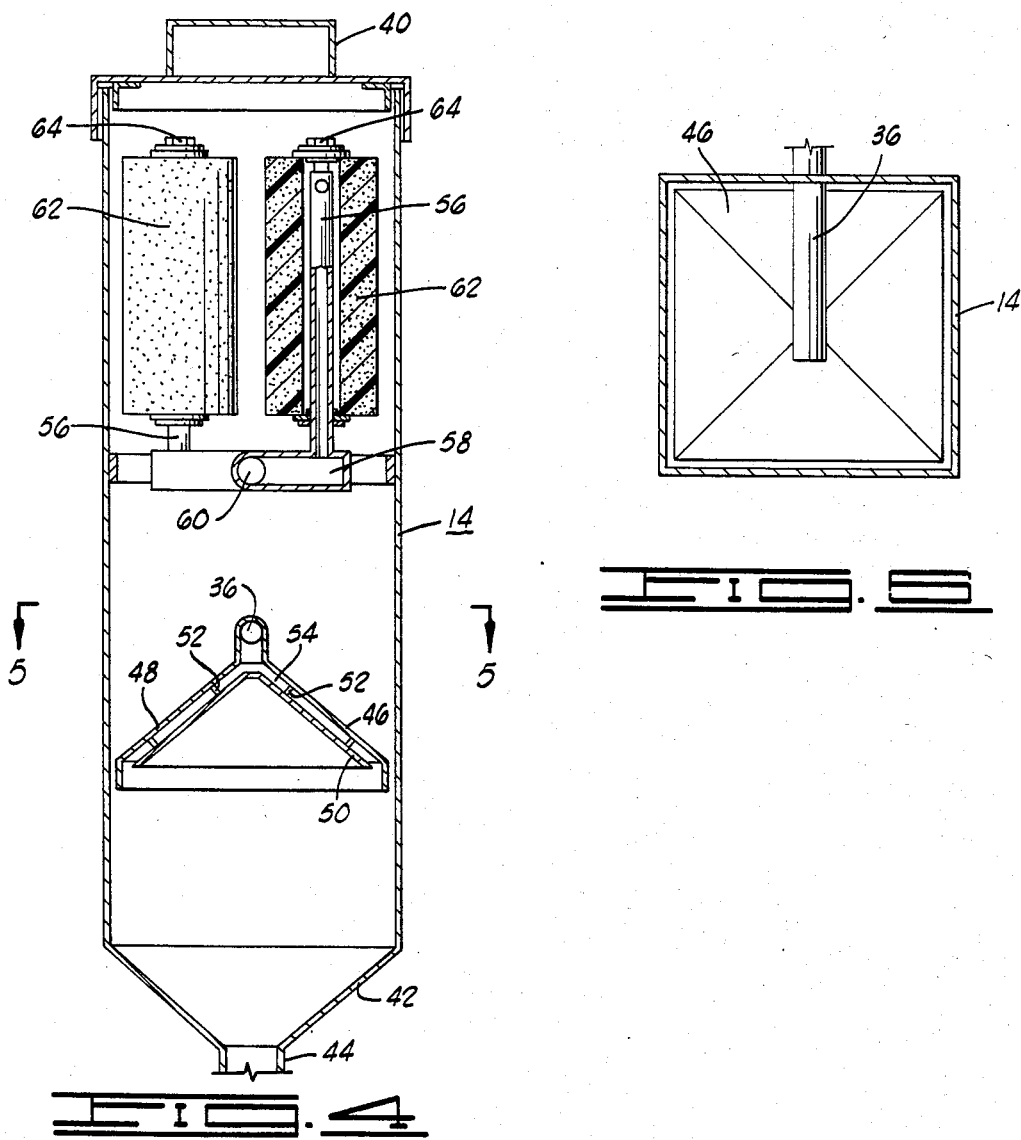

METHOD AND DEVICE FOR FILTERING LUBRICATING OIL FOR A DOUGH DIVIDER MACHINE

BACKGROUND OF THE INVENTION

1. Field of the Invention

This invention relates in general to dough divider machines and methods of operating and lubricating dough divider machines. More particularly it relates to a method and device for filtering contaminants from mineral oil used in lubricating a dough divider machine.

2. Description of the Prior Art

Dough divider machines are well known devices for sifting flour, making dough, separating the dough into measured and weighed pieces and processing these pieces into bakery products such as bread, rolls, buns, and pastries. As these dough divider machines operate they require lubrication for metal to metal friction surfaces and also for locations where metal contacts dough or flour to prevent the dough or flour from sticking or caking to the metal.

In order to provide lubrication, dough divider machines have a system of conduits and nozzles which convey mineral oil to the proper locations in the machine. The nozzles spray the mineral oil to the desired surfaces.

Generally, Mineral oil is used in these dough divider machines because it is less expensive and less likely to become rancid than vegetable oils. However, the mineral oil must be carefully used since Federal Regulations and food quality considerations limit the amount of mineral oil absorbed in the bakery products to less than 0.15% of the total weight of the bakery products.

In the past, there has been no way to determine the percentage of mineral oil in the bakery products other than a chemical analysis of a sample bakery product. This is because not all of the mineral oil injected into the dough divider machine is absorbed in the bakery products. In fact, the vast majority of the mineral oil is collected in catch pans in the bottom of the dough divider machine. These catch pans receive not only the mineral oil but also a large mixture of dough, flour, and contaminates such as bacteria, metal particles, etc.

In the past, these catch pans have been emptied into barrels and the mineral oil, flour, dough, and contaminants are discarded. Obviously, this is wasteful and undesirable. It also produces a serious disposal problem.

Another problem encountered with dough divider machines is clogging of the nozzles which spray the mineral oil lubricant to desired locations. When this occurs, the entire machine is down during repairs to the nozzles. This clogging occurs even though only unused oil is sprayed through the nozzles since even unused oil can be contaminated from the source of the oil or from dust or other contamination after the barrel of oil is opened.

SUMMARY OF THE INVENTION

It is accordingly an object of the present invention to provide a method of lubricating a dough divider machine such that mineral oil is not wasted and clogging of the mineral oil spray nozzles is reduced or eliminated. Particularly, it is an object of this invention to provide such a method whereby mineral oil is filtered to a substantially pure state and then returned to the dough divider machine for lubrication.

Yet another object of the present invention is to provide a method and device for filtering flour, dough, and contaminants from mineral oil used for lubricating a dough divider machine.

Still another object of the present invention is to provide a method of lubricating a dough divider machine with mineral oil such that the total weight percent of mineral oil to bakery product can be more easily determined.

In accordance with these objects, the present invention provides a method of lubricating a dough divider machine of the type which continuously utilizes mineral oil as a lubricant. This method uses the steps of capturing the mineral oil, flour, dough and contaminants which become mixed as the dough divider machine operates. The captured mineral oil, flour, dough and contaminants are then filtered such that substantially pure mineral oil is separated therefrom. This separated and substantially pure mineral oil is then injected back into the dough divider machine for lubrication. New oil is also filterd prior to its first use.

In order to determine the amount of mineral oil in the bakery products produced by the dough divider machine, a step of the present invention is to measure the weight of bakery products which are produced by the dough divider machine during a predetermined period. This can be achieved by recording the number of bakery products produced since the dough divider machine weighs each product. Because the steps of the present invention continually recycle mineral oil, the weight of mineral oil lost as it is utilized to lubricate the dough divider machine can be and is determined for the same predetermined period. From the measured weight of the bakery products and the measured weight of the lost mineral oil, the amount of mineral oil in the bakery products produced during the predetermined period is determined.

Preferably, the filtration step comprises filtration of the mineral oil, flour, dough and contaminants by gravity flow through a first filter surface such that particle size in the mineral oil is reduced to the range of less than 50 to 200 microns. Next, the mineral oil is filtered by suction of the gravity filtered through a diffuser for coalescence and precipitation of particulate flour, dough and contaminants and then through a second filter surface such that particle size in the mineral oil is reduced to the range of less than 10 to 20 microns.

The device of the present invention for filtering flour, dough and contaminants from mineral oil used in lubricating the dough divider machine comprises a first tank for receiving mixed mineral oil, flour, dough and contaminants captured from the dough divider machine. The first tank has an upper opening for receiving mixed mineral oil, flour, dough and contaminants as they are poured into the first tank. A first filtration surface is disposed across the upper opening such that as the mineral oil and contaminants are poured through the upper opening, gravity filtration through the first filtration surface reduces the particle size in the mineral oil to the range of less than 50 to 200 microns. A second tank is disposed adjacent to the first tank and contains a diffuser disposed in a lower portion for coalescing flour, dough and contaminants in mineral oil passing therethrough. A filter section including a second filter surface is disposed in an upper portion of the second tank for receiving mineral oil from the diffuser such that the particle size of flour, dough and contaminants in the mineral oil passing therethrough is reduced to the range of less than 1 to 20 microns. A first conduit is connected to convey the mineral oil from the first tank to the defuser in the second tank. A suction pump is connected to the filter section of the second tank such that mineral oil is drawn from the first tank through the conduit, the diffuser, the filter section and the suction pump. A third tank is connected for receiving mineral oil from the suction pump.

Preferably, the tanks and all of the metal parts of the invention are formed of a stainless steel since the mineral oil is used in processing food. The stainless steel, of course, is less subject to rust and helps to prevent growth of bacteria.

Preferably, the diffuser is comprised of a pyramid-shaped conduit having a peak opening and a base exit. Such a pyramid-shaped diffuser produces a coalescence and precipitation of particulate matter due to the reduced speed of the fluid flow as it passes through the diffuser. Moreover, the pyramid-shape prevents tangential flow and increases the coalescence of particulate matter.

For a further understanding of the invention and further objects, features and advantages thereof, reference may now be had to the following description taken in conjunction with the accompanying drawings.

BRIEF DESCRIPTION OF THE DRAWINGS

FIG. 3 is a plan view of the device of FIG. 1.

FIG. 4 is an enlarged sectional view of a portion of the device of FIG. 1 taken along the lines shown in FIG. 3.

FIG. 5 is an enlarged cross-sectional view of a portion of the device shown in FIG. 1 taken along the lines shown in FIG. 4.

DESCRIPTION OF PREFERRED EMBODIMENTS

Figure 1:
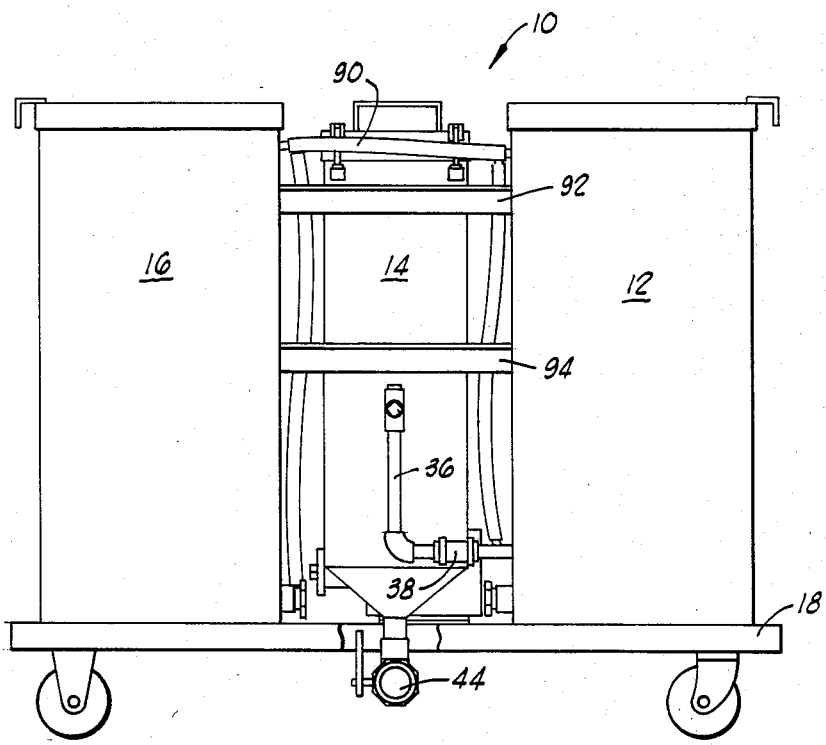
FIG. 1 is a rear elevational view of a filtration device constructed in accordance with the present invention.
Figure 2:
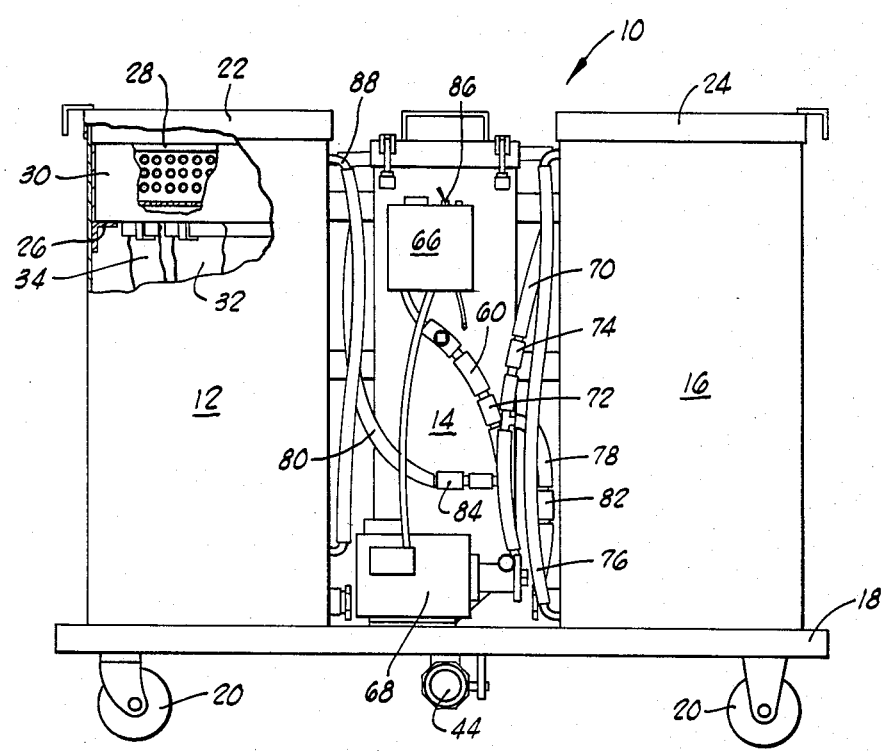
FIG. 2 is a front elevational view of the device of FIG. 1.

Referring now to FIGS. 1, 2, and 3, a filtration device constructed in accordance with the present invention is shown generally at 10. This device includes a first tank 12, a second tank 14, and a third tank 16, all mounted on a base 18. Ground engaging wheels 20, are connected to the lower side of base 18 to allow the filtration device 10 to be rolled from place to place, for movement of oil or for cleaning.

Tanks 12 and 16 are disposed on opposite ends of the base 18 and hold contaminated and clean oil, respectively. Each of these tanks has four rectangular side walls, a bottom, and an open top covered with a hinged lid. Tank 12 is covered with lid 22 and tank 16 is covered with lid 24. The lids, 22 and 24, can be opened for access to the oil in the tanks or for cleaning of the drain tanks. Valves are provided at the bottom of each tank to open the tanks for draining oil or for cleaning.

Tank 12 is provided for receiving the contaminated or to-be-filtered oil. It includes therein three separate filter surfaces through which the oil passes by gravity flow as it is poured through the opened top of tank 12. A shelf-like flange 26 is provided in the upper interior surface of tank 12 to retain the three filter surfaces for gravity filtration as the oil is poured into tank 12.

The first filter surface in tank 12 is a metal sieve 28. This metal sieve 28 is contained within a metal tray 30 which rests upon the shelf flange 26. The sieve 28 has approximately a 40% open pattern and retains all particulate matter larger than approximately one-quarter inch in diameter. The sieve 28 can be removed from tray 30 for cleaning.

The tray 30 has an opening of approximately six inches in diameter for conveying fluid which has passed through the sieve 28. The second and third filter surfaces of tank 12 are retained in and rest upon this opening of the lower part of tray 30. The second filter surface is a 400 micron bag filter 32 and the third filter surface is a 100 micron bag filter 34. The 400 micron bag filter is retained within the 100 micron bag filter 34 and both rest upon the edge of the opening in the bottom of tray 30. The tray 30 can be removed from its position on shelf flange 26 for easy cleaning.

Preferably the bags are a close nylon mesh and are washable for reuse. Nomex TM is one particular brand of suitable bag filter.

Of course, the filtration specifications of the bags can be varied. Preferably, the gravity filtration reduces the particle size in the mineral oil to the range of less than 50 to 200; microns; i.e., the largest particles possibly remaining are in the range of 50 to 200 microns. Less than 100 microns is most preferred.

The clean oil tank 16 is essentially a simple reservoir for retaining the clean oil. If desired, a permanent opening can be provided in lid 24 so that a pump conduit can extend into tank 16 for conveying oil from tank 16 to a dough divider machine without opening lid 24.

Referring to FIGS. 4 and 5 as well as FIGS. 1, 2, and 3, tank 14 is shown. Tank 14 is provided for diffusion filtration and suction filtration of oil which has been gravity filtered through the filters in tank 12. Tank 14 is connected to tank 12 by a conduit 36. A check valve 38 is provided on conduit 36 to prevent flow in the direction of the tank 12. The inlet end of conduit 36 is disposed adjacent to the lowest portion of tank 12 so as to completely exhaust tank 12 of oil during the filtering process.

The tank 14 has four rectangular sides, a lid 40, and an inverted pyramid-shaped bottom 42. A conduit and valve 44 are provided at the lowest end of the pyramid-shaped bottom 42 to allow material to be drained from tank 14. The lid 40 and the conduit and valve 44 can be tightly sealed so that suction filtration through tank 14 can occur.

Fluid enters the suction filtration tank 14 through conduit 36 and enters a pyramid-shaped diffuser conduit 46. The diffuser conduit 46 is disposed in the lower or diffuser section of tank 14.

The diffuser 46 includes an outer diffuser hood 48 and an inner diffuser spreader 50. The diffuser spreader 50 is connected to the diffuser hood 48 by spacer elements 52.

As fluid enters the diffuser 46 through conduit 36, it enters the pyramid-shaped space 54 between diffuser hood 48 and diffuser spreader 50. As the oil moves from the peak of this pyramid-shaped space 54 to the base of the pyramid-shaped space 54, the fluid velocity decreases and the fluid flow causes flour and contaminants to coalesce and precipitate to the lower end of tank 14.

The pyramid-shaped diffuser is superior to a cone-shaped diffuser since the pyramid-shape helps to prevent tangential or whirlpool motion of the oil. Vertical vanes can be added to space 54 to further prevent tangential motion.

The base edges of diffuser hood 52 are spaced from but adjacent to the walls of tank 14. After fluid enters through conduit 36 and passes through the diffuser 46, it passes between the base of diffuser hood 48 and the walls of tank 14 moving upwardly in tank 14. This fluid must pass through the suction filters provided at the upper end of tank 14.

Extending vertically in the upper end of tank 14 are perforated pipes 56. Each pipe 56 has an opening near the upper end of the pipe through which oil is drawn into the pipe, The pipes 56 join at manifold 58 which, in turn, is connected to conduit 60. Conduit 60 exits from the side wall of tank 14.

Pipes 56 have spaced apart flanges and a threaded internal upper end for receiving cylindrical cartridge filters 62. Thus, by removing hex-head bolts or studs 64 threaded to the end of pipes 56, the cartridges can be replaced.

The cylindrical cartridge filters 62 sealingly extend about the pipes 56 for filtering oil which passes into the upper part of tank 14. Oil is drawn through the cartridges by suction in conduit 60, manifold 58 and pipes 56. Preferably, the cartridge filters 62 are formed of polypropylene or the like and filter the mineral oil such that particulate matter therein is reduced to the range of less than 1 to 20 microns. Preferred is the range of less than 1 to 7 microns.

Conduit 60 which exits tank 14 is connected to the suction side of a reversible gear pump 68. The pressure side of the reversible gear pump is connected by a conduit 70 to the upper end of a side wall of tank 16. Check valves 72 and 74 are provided on conduits 60 and 70, respectively, to prevent reverse flow through these conduits.

The vacuum guage and pump control 66 is connected to and monitors the amount of vacuum in conduit 60 and is connected to control the operation of motor and gear pump 68 responsive to the vacuum in line 60. Thus, if the vacuum in line 60 exceeds a predetermined limit the operation of pump 68 is automatically ceased. The amount of vacuum pressure which halts operation of motor and pump 68 can be varied by varying the limit switch on vacuum gauge 66.

Preferably, the limit switch of vacuum gauge 66 is maintained in the range of 10 to 25 inches of mercury of vacuum. This range of pressure with a 10 micron polypropylene cartridge filter 62 produces the most desirable filtration of flour, dough and contaminants from mineral oil used in lubricating a dough divider machine. Most preferable is a vacuum limit setting of 20 inches of mercury.

As the filters 62 become clogged, the amount of vacuum produced by pump 68 increases. Accordingly, the automatic shutoff of pump 68 by vacuum gauge 66 requires that filters 62 be cleaned or replaced.

A clear tube 76 is connected to the upper and lower ends of tank 16 to provide a watch glass indication of the level of oil in tank 16.

To allow for reverse flow of the oil from tank 16 to tank 12, a conduit 78 is connected from the lower end of tank 16 to conduit 70. Also, a conduit 80 is connected from conduit 60 to the upper end of tank 12. Check valves 82 and 84 are provided on conduits 78 and 80, respectively, in order to prevent flow through these conduits other than when motor and gear pump 68 is reversed.

Operation of the motor and gear pump 68 is controlled by a switch 86 on the vacuum gauge control box 66. This switch operates the gear pump in either the normal filtration mode, a reverse mode (which moves the fluid directly from the tank 16 to tank 12), or turns the gear pump off. The vacuum gauge and control box are mounted to the side of tank 14.

A clear tube 88 is connected to the upper and lower ends of tank 12 to provide a watch glass indication of the level of oil in tank 12. Also, a conduit 90 is connected at the upper end of each of tanks 12 and 16 so that overflow of tank 16 will first pass from tank 16 to tank 12.

The tanks 12, 14, and 16 are all joined by horizontal cross bars 92 and 94. These cross bars stabilize and connect the tanks.

All of the metal parts which contact the mineral oil during the filtration process are made of a stainless steel safe for the handling of oil which will come in contact with and be absorbed by the bakery products produced in the dough divider machine. While the device 10 of the present invention can be utilized for filtering other oils or liquids, it is most suitable for the process of filtering mineral oil used to lubricate a dough divider machine as part of the method of the present invention.

In the method of the present invention, divider oil is first filtered through the filtration device 10 to provide pure oil in reservoir 16. This filtration is performed even on unused divider and mineral oil since the filtration improves the mineral oil and helps to prevent clogging of the nozzles in the dough divider machine.

After filtration, the clean oil from tank 16 is pumped into a divider machine oil manifold. Because the filtration device 10 is portable, the oil can be easily rolled to a desired dough divider machine.

As the dough divider machine operates, a pressure pump injects the clean oil through nozzles onto surfaces necessary for lubrication. These include the metal to metal contact friction areas and also the areas where flour and dough contact the dough divider machine metal. Fresh mineral oil must be continuously supplied to these areas since the oil is constantly being removed by dough or metal to metal contact or gravity. Collection pans at the bottom of the dough divider machine receive the mineral oil which has been used in lubrication and which is now contaminated and mixed with flour, dough, and other contaminants such as dust, bacteria, and the like. These capture pans at the bottom of the divider machine are removable.

After the used mineral oil, flour, dough, and contaminants accumulate sufficiently in the capture pans, the pans are removed and the contaminated mineral oil is poured into tank 12 for filtration.

As the mineral oil is poured into tank 12, it is gravity filtered through sieve 28, and bag fliters 32 and 34. This removes flour, dough and contaminants such that the oil which resides in the bottom of tank 12 has all relatively large size particles removed. As described above, a 100 micron bag filter is preferable reducing the particle size to less than 100 micron size.

After gravity filtration in tank 12, gear pump 68 is actuated to draw the mineral oil from tank 12 into the diffuser 46. This causes a coalescence and precipitation of particles into the lower portion of tank 14. The remaining particles of flour, dough, and contaminants move with the oil to the upper portion of tank 14. Some of these particles coalesce and precipitate back to the top of the diffuser 46 or therefrom to the bottom of tank 14.

Cartridge filters 62 finally filter the particles from the mineral oil. As described above a 10 micron polypropylene filter reduces the particle size to less than 10 microns. This filtration can be refined by changing the cartridge filter 62 to a larger or smaller particle size specification filter and also by regulating the predetermined limit on the vacuum gauge 66.

The cleaned oil passes through pump 68 to tank 16 and is held in preparation for reuse. This cleaned mineral oil is then pumped to the dough divider machine manifold for reuse in lubrication.

For cleaning, refiltration, or other reasons, it is desirable to move oil from tank 16 to tank 12. This can be accomplished simply by reversing pump 68 producing flow through conduits 78 and 80.

The dough divider machines which are presently commonly available incorporate therein devices which weigh each bakery product to a very close tolerance. Accordingly, utilizing the presently existing dough divider machines, a determination of the total weight of bakery products produced in a particular machine over a predetermined period can be made simply by an inventory of the number of products. Furthermore, since the method and device of the present invention continuously reuses essentially all of the mineral oil, the amount of mineral oil which is absorbed (by the bakery products) and not recycled can be determined. For example, by filling the tank 16 to a predetermined level at first and then by measuring the amount of new oil required to refill tank 16 to the same level. The amount of lost oil is the amount of new oil added. Thus, the amount of mineral oil first filtered and inserted into the dough divider machine is compared with the amount remaining at the end of the predetermined period and the difference is the amount lost.

Since the total weight of the bakery products is known and the total weight of the mineral oil absorbed by the bakery products is known, a comparison gives the weight percent of mineral oil in each of the bakery products. This provides a means of determining that Federal weight percent requirements have been complied with without the necessity of an analysis of individual bakery products.

The following are examples of uses of the device and method of the present invention. Used divider oil was filtered in a device as described above and the results are tabulated below:

---

1 New Divider Oil (white-light mineral oil, Sontex and/or Binol 100 USP).
2 Used Divider Oil unfiltered with flour, dough and contaminate particles therein.
3 Same used Divider Oil filtered with 2 micron 4" D. × 10" L. Pleated paper filters under 12" Hg. Vac.
4 Same used Divider Oil filtered with 2 micron 4" D. × 10" L. pleated paper filters under 25" Hg. Vac.
5 Same used Divider Oil filtered with 10 micron polypropylene filters under 10" Hg. Vac.
6 Same used Divider Oil filtered with 10 micron polypropylene filters under 25" Hg. Vac. Flour and dough particles unknown.

| ID | TPC mg/ml | Free Fatty Acid | Insoluble Particles |
|----|-----------|-----------------|---------------------|
| #1 | <10.0 | <0.05 | 0.03 |
| #2 | 2,000 | <0.05 | 0.44 |
| #3 | <10.0 | <0.05 | 0.02 |
| #4 | 100 | <0.05 | 0.00 |
| #5 | <10.0 | <0.05 | 0.00 |
| #6 | <10.0 | <0.05 | 0.00 |

TPC = Total Plate Count (mg of bacteria/ml)
Free Fatty Acid (weight percent)
Insoluble Particles (weight percent)
USED DIVIDER OIL CONTAINS:

---

-continued

Enriched Flour (flour, malted barley flour, Niacin, Iron, Thiamine Mononitrate, Riboflavin), Water, Whole Wheat Flour, Corn Syrup, Yeast. Contains 2% or less of each of the following: Partially Hydrogenated Soybean Oil and/or Cottonseed Oil, Wheat Bran, Cracked Wheat, Wheat Gluten, Salt, Whey Solids, Soy Flour, Corn Starch, Yeast Nutrients (Monocalcium Phosphate and/or Calcium Sulfate and/or Ammonium Sulfate), Dough Conditioners (May contain one or more of the following: Mono- and Diglycerides, Ethoxylated Mono- and Diglyccerides, Succinylated Monoglycerides, Polysorbate 60, Sodium and/or Calcium Stearoyl - 2 - Lactylate, Calcium Peroxide, Propylene Glycol Monoesters, Potassium Bromate), Calcium Propionate (Added to retard spoilage).

---

Thus, the method and device of the present invention are well adapted to attain the object and advantages mentioned as well as those inherent therein. While presently preferred embodiments of the invention have been described for the purpose of this disclosure, numerous changes in the details of method steps and in the construction and arrangement of parts can be made by those skilled in the art which changes are encompassed within the spirit of this invention is defined by the appended claims.

The foregoing disclosure and the showings made in the drawings are merely illustrative of the principles of this invention and are not to be interpreted in a limiting sense.

What is claimed is:

1. A method of lubricating a dough divider machine of the type which continuously utilizes mineral oil as a lubricant, comprising:
    capturing mineral oil, flour, dough and contaminants which become mixed as the dough divider machine operates;
    filtering the captured mineral oil, flour, dough and contaminants so that substantially pure mineral oil is separated therefrom;
    injecting the separated mineral oil back into the dough divider machine for lubrication;
    measuring the weight of bakery products which are produced by the dough divider machine during a predetermined period;
    measuring the weight of mineral oil lost as mineral oil is used to lubricate the dough divider machine, is filtered and is returned to lubricate the dough divider machine during said predetermined period; and
    determining from the measured weight of the bakery products and the measured weight of lost mineral oil, the amount of mineral oil in the bakery products produced during said predetermined period.

2. The method of claim 1 wherein said filtering step comprises:
    filtration of said mineral oil, flour, dough and contaminants by gravity flow through a first filter surface such that particle size in said mineral oil is reduced to the range of less than 50 to 200 microns;
    filtration of mineral oil from said gravity filtration step by suction of said mineral oil through a diffuser for coalescence of flour, dough and contaminants and a second filter surface such that particle size in said mineral oil is reduced to the range of less than 1 to 20 microns.

3. The method of claim 2 wherein said diffuser comprises a pyramid-shaped conduit which conveys fluid from a relatively narrow peak of said pyramid-shaped conduit to a relatively broad base of said pyramid-shaped conduit.

* * * * *